April 17, 1951     H. FUCHS     2,548,964
DOOR FASTENER
Filed March 4, 1946     2 Sheets-Sheet 1
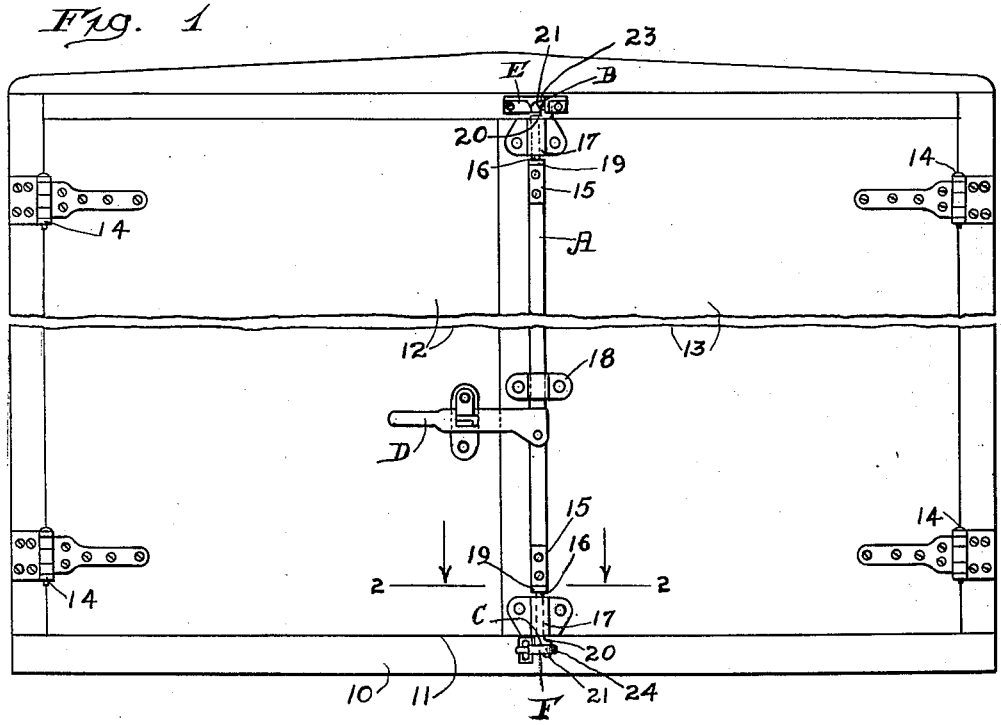
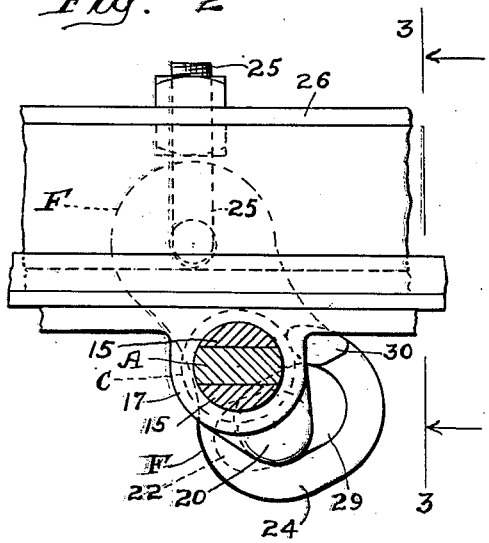
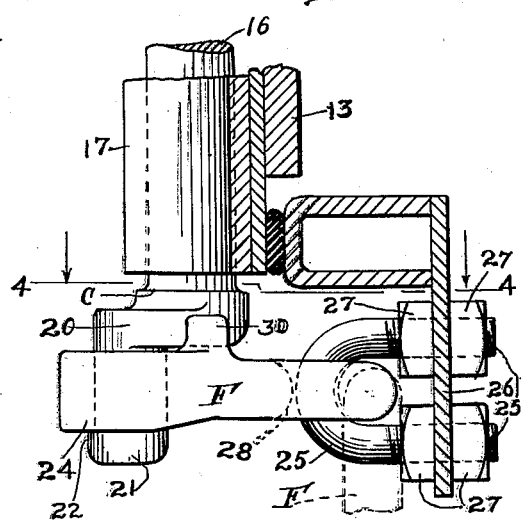
Inventor:
Henry Fuchs April 17, 1951  H. FUCHS  2,548,964
DOOR FASTENER
Filed March 4, 1946  2 Sheets-Sheet 2

Inventor:
Henry Fuchs

Patented Apr. 17, 1951

2,548,964

UNITED STATES PATENT OFFICE 2,548,964

DOOR FASTENER

Henry Fuchs, Chicago, Ill., assignor to W. H. Miner, Inc., Chicago, Ill., a corporation of Delaware Application March 4, 1946, Serial No. 651,730

6 Claims. (Cl. 292—218)

This invention relates to improveemnts in door fasteners for hinged doors and more particularly for hinged doors of automobile trucks.

One object of the invention is to provide a door fastener for automobile trucks comprising a rotary operating bar mounted on the truck door having keeper engaging crank members adapted to cooperate with keeper means mounted on the body of the truck above and below the door opening, wherein the lower keeper means is in the form of a swinging link having an opening within which the crank member is engaged to force the door to partly open position or tightly closed by rotation of the operating bar, and the bar and said lower keeper means are provided with means for positively preventing disengagement of the keeper from the crank member during the operation of forcing the door open and closed, and the link is free to drop to pendant, out of the way position and clear of the usual loading platform when the door is in said partly open position, thereby protecting said lower keeper means against damage which might otherwise occur when the truck is backed against the platform to receive or deliver the lading.

Other objects of the invention will more clearly appear from the description and claims hereinafter following.

Figure 4:
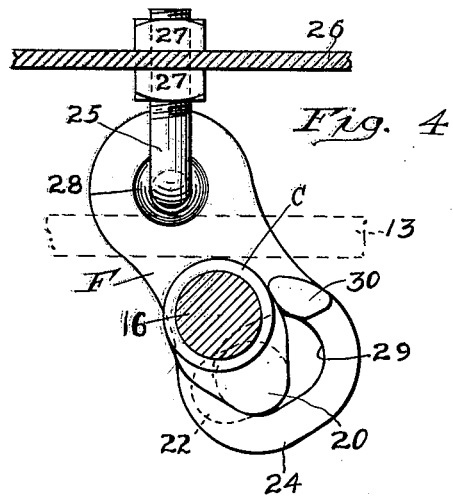
Figure 5:
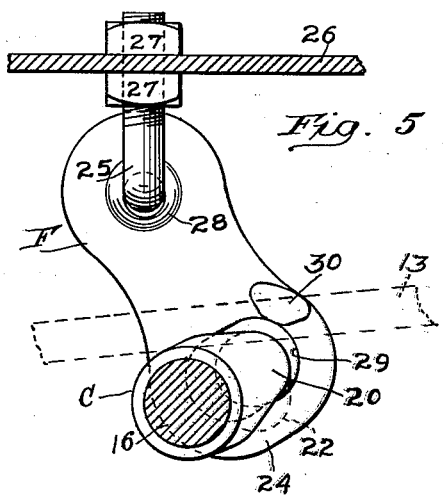
Figure 7:
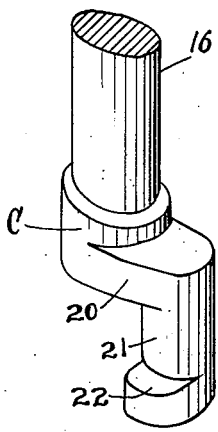
Figure 6:
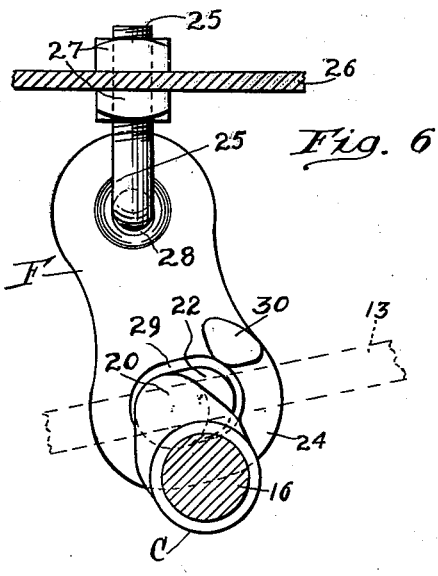
Figure 8:
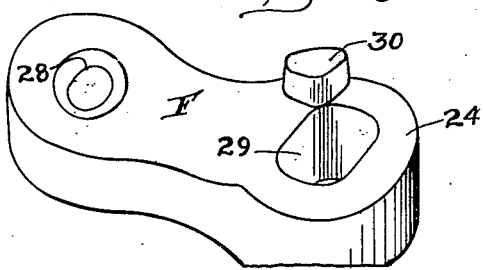

In the drawings forming a part of this specification, Figure 1 is a rear elevational view of a portion of the body of an automobile truck, provided with a door opening and a pair of hinged doors, illustrating my improvements in connection therewith. Figure 2 is a horizontal sectional view, on an enlarged scale, corresponding substantially to the line 2—2 of Figure 1. Figure 3 is a transverse, vertical sectional view, corresponding substantially to the line 3—3 of Figure 2. Figure 4 is a horizontal sectional view, corresponding substantially to the line 4—4 of Figure 3. Figure 5 is a view, similar to Figure 4, but showing the parts of the mechanism in the position occupied when the door has been forced out of the door opening. Figure 6 is a view, similar to Figure 4, showing the parts of the mechanism in the position occupied when the door has been forced open to a greater extent than in Figure 5. Figures 7 and 8 are detailed perspective views respectively of the lower end portion of the rotary operating bar and the lower keeper of my improved mechanism.

In said drawings, 10 indicates the rear wall of au automobile refrigerator truck having a door opening 11 therein, closed by a pair of hinged doors 12 and 13. Each door is provided with the usual hinges 14—14 along the vertical outer side edges thereof by which the door is swingingly supported. As is common practice, the door member 12, which is that first closed, and the door member 13 have their meeting edges beveled and so inclined that the door 13 will maintain the door 12 in closed position and wedge the same shut when the door fastener is actuated to force the door 13 closed. The edges of the doors and the door frame are provided with the usual insulating packing material, not shown.

Referring to the drawings, my improved door fastener mechanism comprises broadly an operating locking bar A; an upper keeper engaging end member B; a lower keeper engaging end member C; an operating lever D for rotating the bar A; an upper keeper E; and a lower keeper F.

The operating bar A is in the form of an elongated member of rectangular, transverse cross section and has the members B and C riveted thereto. The upper and lower end members B and C are of similar design, except as hereinafter pointed out. Each end member has a forked portion 15 which embraces the bar A at opposite sides and has rivet members extending therethrough and through the bar. Outwardly of the forked portion 15, each end member has a cylindrical portion 16 which is rotatably supported in a guide member 17 fixed to the door 13, two such guide members being provided, one for the lower and another for the upper keeper engaging member. The guide members 17—17 are of any well-known design. Intermediate the guide members 17—17, the bar is supported by a third guide member 18, which is fixed to the door 13. Between the portions 15 and 16 thereof, each end member is enlarged, as indicated at 19, to provide an annular abutment shoulder adapted to limit endwise movement of the bar with respect to the corresponding guide member. At the outer end thereof, outwardly of the cylindrical bearing portion 16, each of the end members is provided with a radially projecting crank member 20 having a crank pin 21 at its outer end. The structure of the operating bar and the keeper engaging members thus far described is well known in this art and the upper keeper engaging member B is of the type commonly employed in rotary bar door fasteners having keeper engaging crank members, the crank pin 21 thereof being in the form of a cylindrical projection.

The crank pin 21 of the lower keeper engaging member C is provided with a radially outwardly projecting, horizontal flange of arcuate shape which forms a retaining lug 22 adapted to cooperate with the lower keeper F and supports the latter while the door 13 is being moved into and out of the door opening.

The operating lever D is of the usual type, being pivotally secured to the bar A so that it may be dropped to pendant position. When in horizontal position, the operating lever D serves as a handle member for rotating the bar, and is locked to the usual latch means to secure the door in closed position. In operating the bar A by the lever D, the latter has swinging movement in a horizontal path through an angle of approximately 180 degrees.

The upper keeper E is of the usual design, the same being provided with a cam slot 23 within which the crank pin 21 of the upper keeper engaging member B is adapted to engage.

The lower keeper F is in the form of a heavy, substantially flat link which is thickened at its outer end to provide an enlarged head portion 24. The keeper F is supported from the end of the truck, being swiveled or hinged at its inner end to a supporting clevis 25 secured to the end sill 26 of the truck body by nuts 27—27. At the rear end portion thereof, the link F has a vertical perforation or opening 28 which extends therethrough and within which the clevis is engaged. At the top and bottom sides of the link, the opening 28 is flared, the walls forming the flared portions of the opening being preferably rounded, as shown in Figure 3, to provide for smooth swiveling action of the link on the clevis. The head 24 of the link F has a transversely extending, elongated slot 29 therein which is adapted to receive the crank pin 21 of the lower keeper engaging member C for rotary movement. The slot 29 extends entirely through the head of the link F and is of slightly greater width than the diameter of the crank pin 21. At the upper side of the link, the head member 24 is provided with an upstanding stop lug 30 adapted to be engaged by the crank arm 20 of the member C to control movement of the link and fix the position of the same with respect to the crank pin 21 of said member when the truck door has been forced tightly closed.

As shown most clearly in Figure 3, the end sill 26 of the truck is inwardly offset with respect to the rear end of said truck, and the keeper F when in horizontal position projects outwardly beyond the doors 12 and 13 of the truck and has the crank pin 21 of the keeper engaging member C accommodated for rotary movement in the slot 29 thereof with the lug 22 engaged beneath said link in supporting relation thereto, the crank pin being held at the extreme left hand end of said slot, as shown in Figure 4, by engagement of the crank arm 20 with the upstanding stop lug 30 of the link. As will be evident, the link F may be swung or dropped to pendant position against the end sill 26 of the truck where it will be out of the way, underneath the projecting rear end of the truck body when the crank member and link are in the position shown in Figure 6 and thus protect the link from damage when the truck is backed against a loading platform. The projecting lug of the keeper engaging member C is so located that it will be in registration with the slot 29 of the link when the door is in partly closed position to be cammed shut by the keeper engaging member of the operating bar. The link F is designed to be in its pendant position, folded against the end sill 26 when the truck doors are fully open.

The operation of my improved door fastener is as follows: When the doors are in closed position and locked by the door fastener, the link F is horizontally disposed, as clearly shown in Figure 3. In this position the crank pin 21 of the lower keeper engaging member C is engaged through the slot 29 of the link with the lug 22 engaged underneath the link in supporting relation thereto, as shown in Figures 2 and 4, the crank pin 21 being held at the left hand end of the slot by engagement of the side edge of the crank arm 20 with the upstanding stop lug 30 of the link and the operating handle lever D latched in the position shown in Figure 1. While the link F is thus supported, the operating bar A is rotated in contra-clockwise direction, as viewed in Figures 2 and 4, to force the door open by camming engagement of the upper keeper engaging member B with the slot of the upper keeper E and by the crank connection of the lower keeper engaging member C with the link F, the link acting in the manner of a connecting rod. As the bar is thus rotated, the lug 22 of the keeper engaging member C remains in supporting position with respect to the link F, as shown in Figure 5. This condition exists until the operating lever D has been swung through approximately 180 degrees and against the door 13 and the door has been pried partly open so that it may be swung completely open by hand. In this position, the lug 22 registers with the slot 29 of the link, as shown in Figure 6, and the link is free to drop to pendant out of the way position, as hereinbefore mentioned, there being sufficient play of the lower crank pin 21 in the opening or slot 29 to permit the link to swing freely. In the event that the link F becomes displaced during this operation of forcing the door open so that it does not occupy exactly the position shown in Figure 6, but has swung slightly to the left from that position, with the result that the lug 22 is not freed from its supporting engagement, the lug may readily be brought into registration with the slot 29 to free the link by manually swinging the link to the position shown in Figure 6.

In closing the door 13, the same is first swung to partly closed position, the operating bar at this time being in the position assumed when the door was forced open, that is, with the crank pin 21 and the lug 22 of the lower keeper engaging member C in position to register with and enter the slot 29 of the link F. The attendant then lifts the link to horizontal position, thus engaging the lower crank pin 21 together with its lug 22 through said slot. While momentarily supporting the link F in horizontal position, the attendant rotates the bar A to such an extent in clockwise direction, that the lug 22 is engaged underneath the link to support the latter. In performing this operation of forcing the door tightly closed, the parts of the fastener mechanism are moved from the position shown in Figure 6 through that shown in Figure 5 to the position shown in Figure 4. During this entire operation, the lug 22 of the crank pin 21 of the member C acts to support the link F and the crank pin is brought to the left hand end of the slot 29, as shown in Figure 4, by the link F being forced to the right through engagement of the arm 20 of the crank member with the lug 30 of the link. Inasmuch as the link F is positively supported during the remainder of the operation of forcing the door shut after the lug has been once engaged underneath the link by slight rotation of the bar, as hereinbefore pointed out, the attendant is free to release his hold from the link F as soon as it has been thus engaged with the link, thereby eliminating all danger of injury which might otherwise occur if he were compelled to manually support the link during the entire operation of forcing the door tightly closed.

I claim:

1. In a door fastener for a hinged door of an automobile truck, the combination with a vertically disposed, rotary operating bar mounted on the door; of crank arms at the upper and lower ends of said bar; a crank pin at the outer end of each arm; a radially projecting supporting lug at the outer end of the pin of said lower crank arm; keepers above and below the door with which said crank arms cooperate in forcing the door open or closed, said lower keeper being swiveled at its inner end for both lateral and vertical swinging movement and being manually swingable to horizontal position into engagement with said lower crank arm, said lower keeper having a transverse slot therethrough within which the crank pin of the lower crank arm is engageable, said slot being of a length to permit said crank pin and lug to pass therethrough when in registration therewith; and a stop shoulder on said lower keeper engageable by said lower crank arm when rotated in door closing direction with said pin engaged in said slot for controlling movement of said crank pin in said slot and thereby maintaining said lug engaged underneath the lower keeper.

2. In a door fastener for a hinged door of an automobile truck, the combination with a vertically disposed, rotary operating bar mounted on the door, said bar being rotatable in reverse directions to force the door open and closed; of a keeper link below said door swiveled at its inner end to said truck for lateral and vertical swinging movement, said link having an elongated slot therethrough at the outer end thereof; a crank arm on the lower end of said bar rotatable therewith, said crank arm including a crank pin engageable within said slot, said crank pin having a supporting lug at its lower end engageable beneath the link to support the same in horizontal position with the crank pin engaged in said slot, said slot being of a length to permit the crank pin and lug to pass therethrough when registered with said slot; and an upstanding stop projection on said link in the path of movement of said crank arm and engageable thereby, when the crank arm is rotated in door closing direction with the crank pin engaged in said slot, to hold the link in position with the lug of said crank pin engaged beneath the link to support the same.

3. In a door fastener for a hinged door of an automobile truck, the combination with a vertically disposed, rotary operating bar mounted on the door, said bar being rotatable in reverse directions to force the door open and closed; of a keeper link below said door pivoted at its inner end on said truck for lateral and vertical swinging movement, said link having a transversely extending, elongated slot at the outer end thereof extending entirely through said link; a crank member on the lower end of said bar rotatable therewith, said crank member including a radial crank arm on said bar and a crank pin at the outer end of said arm rotatably engageable within the slot of said link, said pin extending through said link and having a radial supporting lug at the lower end thereof engageable beneath the link to support the same in horizontal position with the crank pin engaged in said slot, said slot being of a length to permit the crank pin and lug to pass freely therethrough when registered with said slot; and a lug on said link in the path of rotary movement of said crank arm and engageable thereby, when the crank arm is rotated in door closing direction with the crank pin engaged in said slot, to hold said link with the wall at one end of the slot thereof seated against the crank pin to hold the lug of said pin in engagement with the underneath side of the link beyond said end of the slot.

4. In a door fastener for a hinged door of an automobile truck, the combination with a vertically disposed rotary operating bar mounted on the door, said bar being rotatable in reverse directions to force the door open or closed; of a clevis fixed to the end of the truck below said door; a keeper link swingingly supported at its inner end on said clevis for horizontal and vertical swinging movement, said link having a transversely extending, elongated slot at the outer end thereof extending entirely through said link; a radial crank arm at the lower end of said bar; a depending crank pin at the outer end of said crank arm, said crank pin being rotatably engageable in said slot; a radial lug at the lower end of said pin engageable beneath the link to support the same, said slot being of a length to permit passage of the crank arm and lug therethrough when registered therewith with the pin disposed at one end of the slot and the lug at the other end; an upstanding stop projection on said link in the path of rotary movement of said crank arm and engageable by said arm, when said arm is rotated in door closing direction with the crank pin engaged in said slot, to hold said crank pin at said first named end of the slot with the radial lug thereof engaged beneath the link.

5. In a door fastener for a hinged door of an automobile truck, the combination with a vertically disposed, rotary operating bar mounted on the door, said bar being rotatable in reverse directions to force the door open and closed; of a radial arm at the lower end of the bar; a depending crank pin at the outer end of said arm, said pin having a radially projecting lug at its lower end; a link swingingly supported at its inner end on said truck below said door, said link having a transversely extending, elongated slot at its outer end within which said crank pin is engageable, said slot being of slightly greater width than the diameter of said pin and of a length exceeding the diameter of said pin by an amount at least as great as the projection of said lug from the pin; and an upstanding abutment on said link at one end of said slot, said abutment being in the path of rotary movement of said arm and engageable thereby, when said arm is rotated in door closing direction with the crank pin engaged in said slot, to hold said link positioned with the crank pin of said arm at the end of the slot which is remote from said abutment.

6. In a door fastener for a hinged door of an automobile truck, the combination with a vertically disposed, rotary operating bar mounted on the door; of a radial crank arm at the lower end of said bar having a depending crank pin at its outer end provided with a radially offset lower end; a link swiveled to the truck below the door, said link having an opening therethrough at its outer end for receiving said crank pin for rotary movement with the offset end of said pin engaged beneath the link to support the latter in horizontal position, said opening being of a length to permit free passage of the crank pin and its offset end therethrough when registered therewith; and a stop shoulder on said link engageable by said arm when the door is fastened in closed position, with the crank pin engaged in said opening of said link, for holding said link positioned with the pin of the crank arm at one end of said opening and the offset end of said pin engaged beneath said link to support the latter.

HENRY FUCHS.

REFERENCES CITED

The following references are of record in the file of this patent:

FOREIGN PATENTS

| Number | Country | Date |
| --- | --- | --- |
| 158,122 | Germany | Jan. 31, 1905 |